United States Patent [19]
Fujinami

[11] Patent Number: 5,343,248
[45] Date of Patent: Aug. 30, 1994

[54] MOVING IMAGE COMPRESSING AND RECORDING MEDIUM AND MOVING IMAGE DATA ENCODER AND DECODER

[75] Inventor: Yasushi Fujinami, Kanagawa, Japan

[73] Assignee: Sony Corporation, Tokyo, Japan

[21] Appl. No.: 913,816

[22] Filed: Jul. 16, 1992

[30] Foreign Application Priority Data
Jul. 26, 1991 [JP] Japan .................. 3-209916

[51] Int. Cl.$^5$ .......................... H04N 7/01; H04N 7/08
[52] U.S. Cl. ................................. 348/452; 348/474
[58] Field of Search ............... 358/140, 142, 147, 130, 358/133; 348/526, 474, 448, 449, 452; H04N 7/08, 7/01

[56] References Cited
U.S. PATENT DOCUMENTS

| | | | |
|---|---|---|---|
| 4,608,602 | 8/1986 | Grantham | 348/526 |
| 4,641,188 | 2/1987 | Dischert | 358/140 |
| 4,956,708 | 9/1990 | Itagaki | 358/140 |
| 4,992,853 | 2/1991 | Cavallerano | 358/133 |
| 5,121,205 | 6/1992 | Ng et al. | 358/142 |
| 5,175,618 | 12/1992 | Ueda et al. | 358/136 |

FOREIGN PATENT DOCUMENTS
2030419 4/1980 United Kingdom ........ H04N 35/00

Primary Examiner—Mark R. Powell
Assistant Examiner—Jeffrey S. Murrell
Attorney, Agent, or Firm—William S. Frommer; Alvin Sinderbrand

[57] ABSTRACT

An interlace-system moving image can be prevented from being blurred when a scene is changed. A frame header is provided at the top of data of one frame formed of two fields and a field flag is recorded in the frame header. The field flag is used to identify whether the frame is started with an odd field or with an even field.

11 Claims, 10 Drawing Sheets

FIG. 8

| Preceding Field | Kinds of Picture | Original Image | | Locally-Decoded Image | | | |
|---|---|---|---|---|---|---|---|
| | | Frame Memory 2f – Image Data of Preceding Field | Frame Memory 2b – Image Data of Delay Field | Frame Memory 14af – Image Data of Preceding Field | Frame Memory 14ab – Image Data of Delay Field | Frame Memory 14bf – Image Data of Preceding Field | Frame Memory 14bb – Image Data of Delay Field |
| Odd Field | I | 4o | 4e | 4o | 4e | 3o ← | 3e ← |
| Odd Field | P | 5o | 5e | (4o) | (4e) | 5o | 5e |
| Odd Field | P | 6o | 7o | 6o | | (5o) | (5e) |
| Even Field | I | 6e | 8o | 7e | 8o | 6e | 7o |
| Even Field | P | 7e | 9o | (7e) | (8o) | (6e) | (7o) |
| Even Field | P | 8e | | | | 8e | 9o |

FIG. 14

| 4o | 5e | 5o | 5e | 6o | 6e | 7o | 7e | 8o |

FIG. 15

| Input | Kind of Picture | Frame Memory 36af<br>Image Data of Preceding Field | Frame Memory 36ab<br>Image Data of Delay Field | Frame Memory 36bf<br>Image Data of Preceding Field | Frame Memory 36bb<br>Image Data of Delay Field | Output |
|---|---|---|---|---|---|---|
| 4o |   |   |   |   |   | — |
| 4e | I | 4o |   |   |   | 4o |
| 5o |   |   | 4e |   |   | 4e |
| 5e | P |   |   | 5o |   | 5o |
| 6o |   |   |   |   | 5e | 5e |
| 6e | P | 6o |   |   |   | 6o |
| 7o |   |   |   | 6e |   | 6e |
| 7e | I | 7e |   |   |   | 7o |
| 8o |   |   |   |   | 7o | 7e |
|   | P |   | 8o |   |   | 8o |

MOVING IMAGE COMPRESSING AND RECORDING MEDIUM AND MOVING IMAGE DATA ENCODER AND DECODER

BACKGROUND OF THE INVENTION

1. Field of the Invention

The present invention relates to a moving image compressing and recording medium and moving image data encoder and decoder for recording moving image data on a disc such as a compact disc or the like.

2. Description of the Prior Art

One frame of the NTSC video signal is composed of two fields, an odd field and an even field, as shown in FIG. 1 of the accompanying drawings. When a moving image is compressed by utilizing a DCT (discrete cosine transform), two fields are processed as one frame in a so-called progressive-scan fashion because the increase of resolution in the spatial direction is responsible for the increase of compression efficiency.

However, as shown in FIG. 2 of the accompanying drawings, it is frequently observed that a scene A is changed to a scene B between two fields forming one frame. Further, when a film such as a movie film or the like is converted into a video signal as shown in FIG. 3 of the accompanying drawings, it is frequently observed that a scene is changed between two fields forming one frame.

Conventional apparatus usually process two fields as one frame even when a scene is changed therebetween. Consequently, a moving image compressing efficiency is lowered and an image is blurred in its peripheral portion.

OBJECTS AND SUMMARY OF THE INVENTION

Accordingly, it is an object of the present invention to provide a moving image compressing and recording medium in which the aforesaid shortcomings and disadvantages encountered with the prior art can be eliminated.

Further, it is an object of the present invention to provide a moving image compressing and recording medium which can prevent an image from being blurred.

Another object of the present invention is to provide a moving image data encoder which can prevent an image from being blurred.

Still another object of the present invention is to provide a moving image data decoder which can prevent an image from being blurred.

According to a first aspect of the present invention, a moving image compressing and recording medium in which interlace-system moving image data is compressed and then recorded includes a flag recorded thereon for identifying a frame starting with an odd field and a frame starting with an even field.

According to a second aspect of the present invention, a moving image data encoder comprises means for processing an interlace-system moving image for an odd field and an interlace-system moving image for an even field in a progressive-scan fashion to encode an image for one frame, and means for independently encoding an image for one field.

In accordance with a third aspect of the present invention, a moving image data decoder for decoding interlace-system compressed moving image data transmitted with a flag for identifying a frame starting with an odd field and a frame starting with an even field comprises means for detecting the flag, and means for changing an operation mode in response to detected result of the flag.

The moving image compressing and recording medium formed as set forth above has the flag recorded thereon for identifying whether the frame is started with the odd field or with the even field. Accordingly, by determining this flag, the moving image can be decoded correctly even when a scene is changed between the fields.

Further, according to the moving image data encoder of the present invention, when a scene is changed, an image for one field is encoded independently so that the image can be prevented from being blurred.

Furthermore, according to the moving image data decoder of the present invention, an NTSC encoder, for example, is initialized in response to a detected result of the flag. Therefore, correct odd and even fields can constantly constitute one frame.

The above and other objects, features, and advantages of the present invention will become apparent from the following detailed description of illustrative embodiments thereof to be read in conjunction with the accompanying drawings.

BRIEF DESCRIPTION OF THE DRAWINGS

FIG. 8 is a diagram used to explain a timing at which frames of image data are processed by respective section of the moving image data encoder according to the embodiment shown in FIG. 4;

FIG. 14 is a diagram used to explain input data in the embodiment shown in FIG. 11; and FIG. 15 is a diagram used to explain a timing relation with which frames of data are processed in respective sections in the embodiment shown in FIG. 11.

DETAILED DESCRIPTION OF THE PREFERRED EMBODIMENTS

The present invention will now be described in detail with reference to the drawings.

Figure 1:
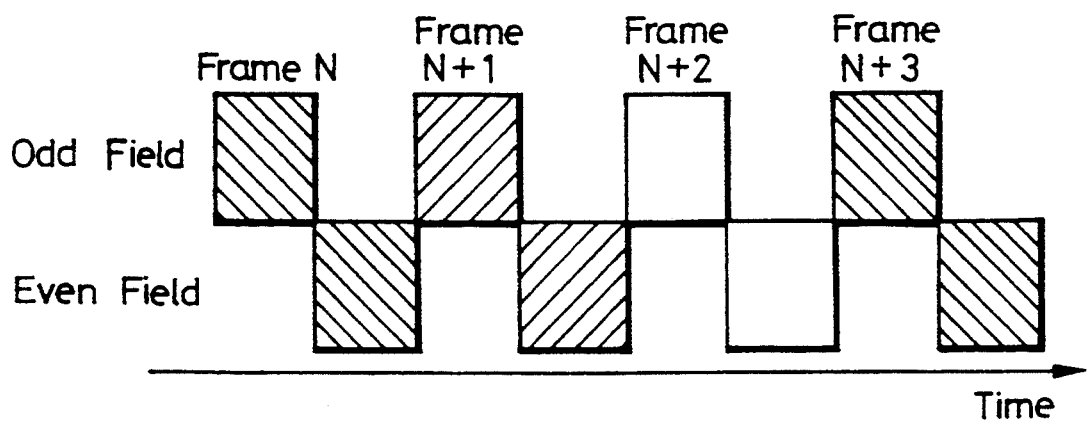
FIG. 1 is a diagram used to explain a structure of a frame of a video signal according to the NTSC system.
Figure 2:
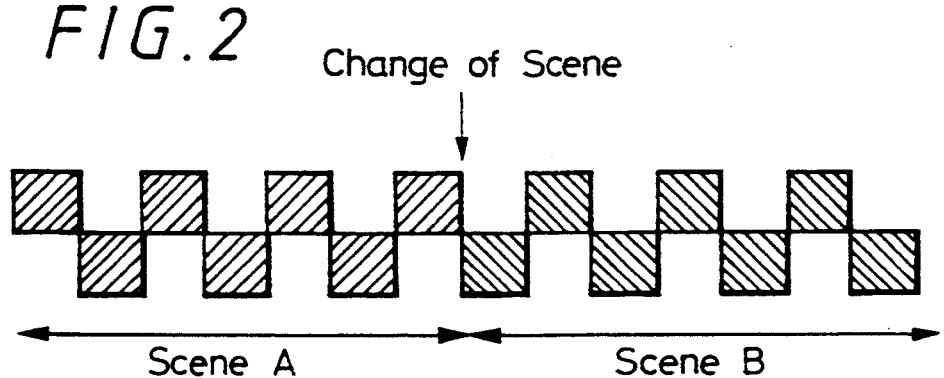
FIG. 2 is a diagram used to explain a structure of a frame under the condition such that a scene is changed.
Figure 3:
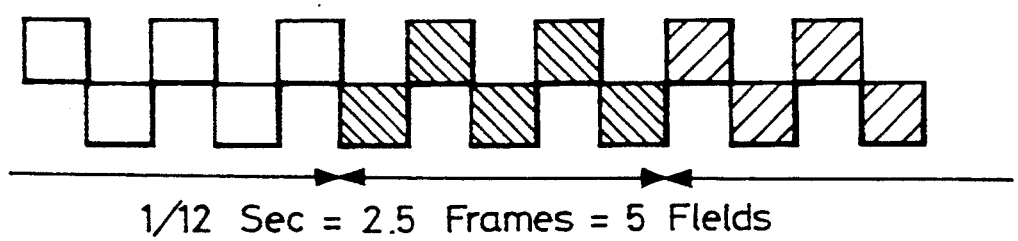
FIG. 3 is a diagram used to explain a structure of a frame under the condition such that a movie film is converted into a video signal.
Figure 4:
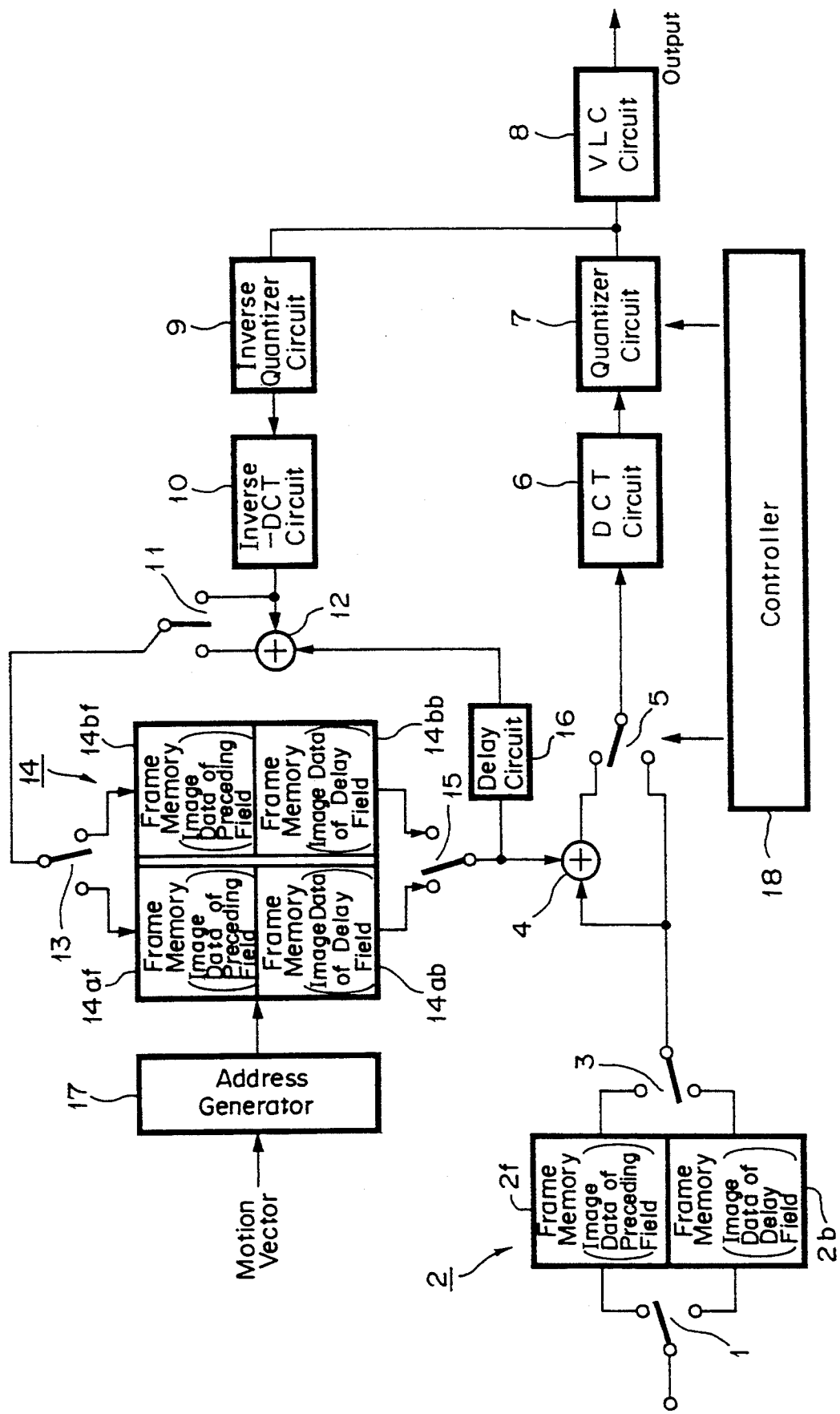
FIG. 4 is a block diagram showing an arrangement of a moving image data encoder according to an embodiment of the present invention.

FIG. 4 of the accompanying drawings shows in block form an arrangement of a moving image data encoder according to an embodiment of the present invention.

As shown in FIG. 4, image data for one field is supplied through a switch 1 and written in a frame memory 2 (frame memories 2f and 2b). The frame memory 2f is adapted to store image data of a preceding field and the frame memory 2b is adapted to store image data of a delay field. Image data read-out from the frame memories 2f, 2b are supplied through switches 3, 5 to a discrete cosine transform (DCT) circuit 6. The DCT circuit 6 operates to process input data in a DCT fashion. A quantizer circuit 7 is adapted to quantize an output of the DCT circuit 6 in response to a quantizing step designated by a controller 18 and outputs a quantized output. The quantized output from the quantizer circuit 7 is supplied to and processed by a variable length coder (VLC) circuit 8 in a VLC fashion, whereafter it is recorded on some suitable recording media, such as a disc or the like, not shown.

The quantized output from the quantizer circuit 7 is also supplied to and inversely-quantized by an inverse-quantizer circuit 9. The thus inversely-quantized output is supplied to an inverse DCT circuit 10, in which it is processed in an inverse-DCT fashion. An output from the inverse-DCT circuit 10 is supplied through switches 11, 13 to a frame memory 14 and is thereby stored in any one of frame memories 14af, 14ab, 14bf, 14bb forming the frame memory 14. An address generator 17 operates to generate an address in response to a motion vector supplied thereto from a circuit (not shown) and supplies the same to the frame memory 14. Data read-out from the frame memory 14 is supplied through a switch 15 to an adder circuit 4, in which it is added with the data read-out from the frame memory 2. Then, the resultant data is supplied from the adder circuit 4 through the switch 5 to the DCT circuit 6 and the quantizer circuit 7.

The data delivered from the switch 15 is delayed by a predetermined delay time by a delay circuit 16 and then supplied to an adder circuit 12, in which it is added with the output of the inverse-DCT circuit 10. The output of the adder circuit 12 is supplied through the switches 11, 13 to the frame memory 14 and stored therein. The delay time of the delay circuit 16 is determined in accordance with a processing time of the adder circuit 4, the DCT circuit 6, the quantizer circuit 7, the inverse-quantizer circuit 9 and the inverse-DCT circuit 10. The controller 18 operates to control switching operations of the above respective switches and operation of respective circuits.

Operation of the controller 18 will be described below. The controller 18 determines the frame structure in accordance with a flowchart forming FIG. 5, for example.

Figure 5:
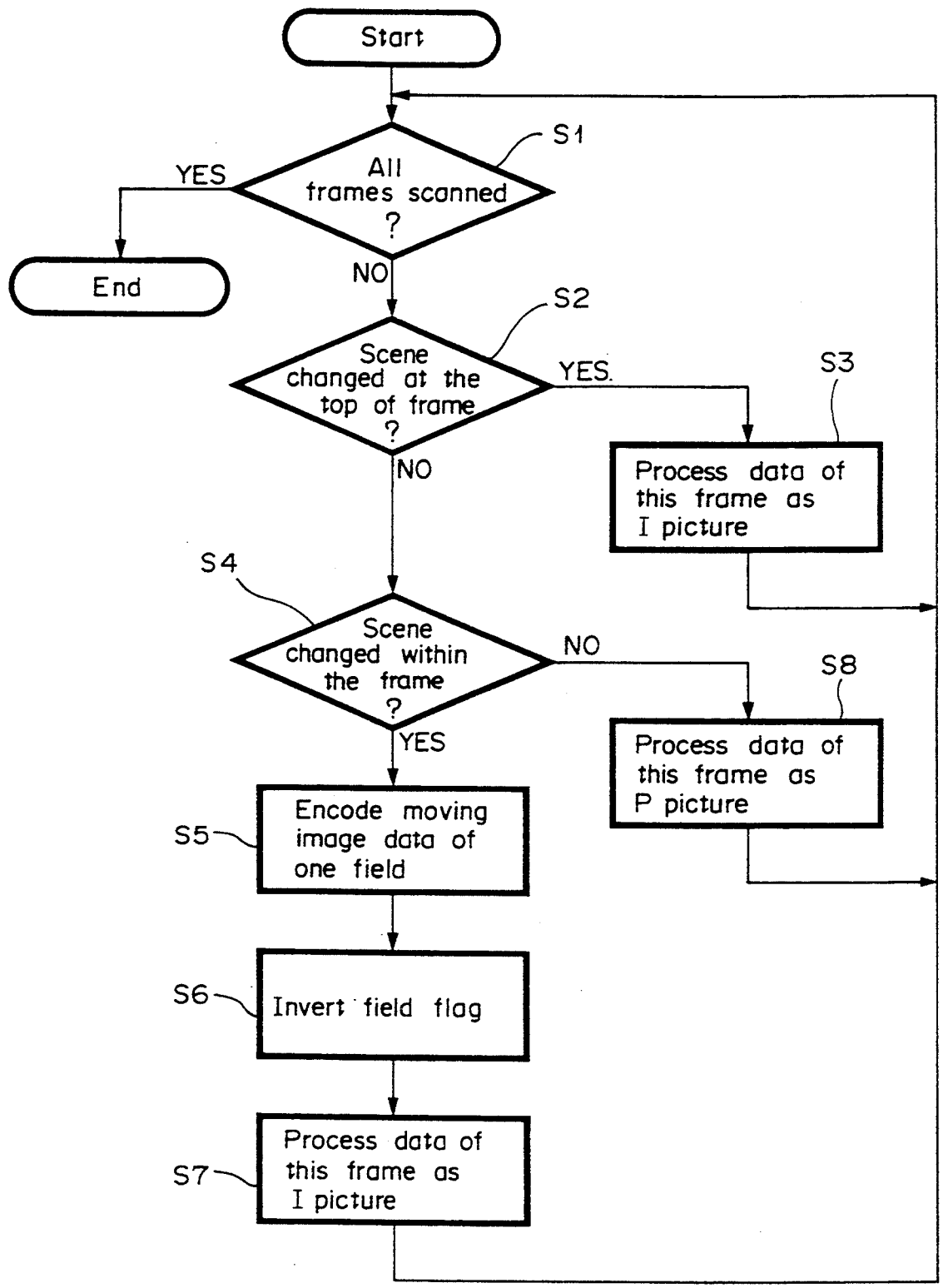
FIG. 5 is a flowchart to which references will be made in explaining an algorithm with which a frame structure is determined according to the embodiment shown in FIG. 4.

Referring to FIG. 5 of the accompanying drawings, following the Start of operation, it is determined in decision step S1 whether or not all frames are scanned.

If all frames are not yet scanned as represented by a NO at decision step S1, then the processing proceeds to the next decision step S2. It is determined in decision step S2 whether or not a scene is changed at the top of the frame. If the scene is changed at the top of the frame as represented by a YES at decision step S2, then the processing proceeds to step S3, whereat this frame is processed as an intra-coded picture (hereinafter simply referred to as an I picture). After the processing at step S3 is ended, the processing returns to step S1.

If a scene is not changed at the top of the frame as represented by a NO at decision step S2, then the processing proceeds to the next decision step S4. Then, it is determined in decision step S4 whether or not the scene is changed between the fields of the frame. If the scene is changed between the fields of the frame as represented by a YES at decision step S4, then the processing proceeds to step S5, whereat moving image data of one field is encoded instead of moving image data of two fields (one frame). Then, the processing proceeds to step S6, whereat a field flag is inverted. The field flag is set to "0" if the frame begins with an odd field, for example, and set to "1" if the frame begins with an even field (see FIG. 10 which will be referred to later). Further, the processing proceeds to the next step S7, whereat this frame (the frame next to the frame in which the single field processed at step S5) is processed as an I picture. The processing returns from step S7 to step S1.

If the scene is not changed between the fields of the frame as represented by a NO at decision step S4, then the processing proceeds to step S8, whereat this frame is processed as a predictive-coded picture (hereinafter simply referred to as a P picture). Then, the processing returns from step S8 to step S1.

The I picture (intra-frame coded picture) means a picture that is encoded only by the data within the frame. Further, the P picture means (predictive-coded picture) means a picture predicted from an I picture which precedes the P picture from a time standpoint or a picture predicted from another P picture.

Figure 6:
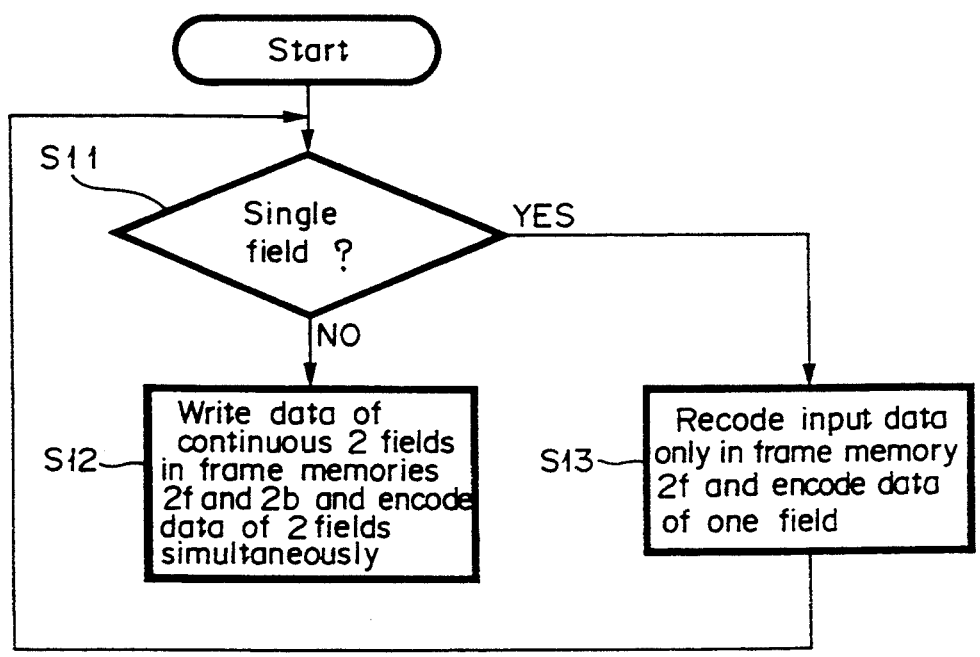
FIG. 6 is a flowchart to which references will be made in explaining an algorithm at which a unit of data to be encoded is determined according to the embodiment shown in FIG. 4.

FIG. 6 of the accompanying drawings shows an algorithm at which a unit of data to be encoded is determined.

Referring to FIG. 6, following the Start of operations, it is determined in decision step S11 whether or not a field is a single field. If the field is not the single field as represented by a NO at decision step S11, then the processing proceeds to the next step S12, whereat data of two continuous fields are sequentially written in the frame memories 2f, 2b and data of two fields are encoded simultaneously. If on the other hand the field is the single field as represented by a YES at decision step S11, then the processing proceeds to step S13, whereat input data is recorded only in the frame memory 2f and then only the data of one field is encoded.

Figure 7:
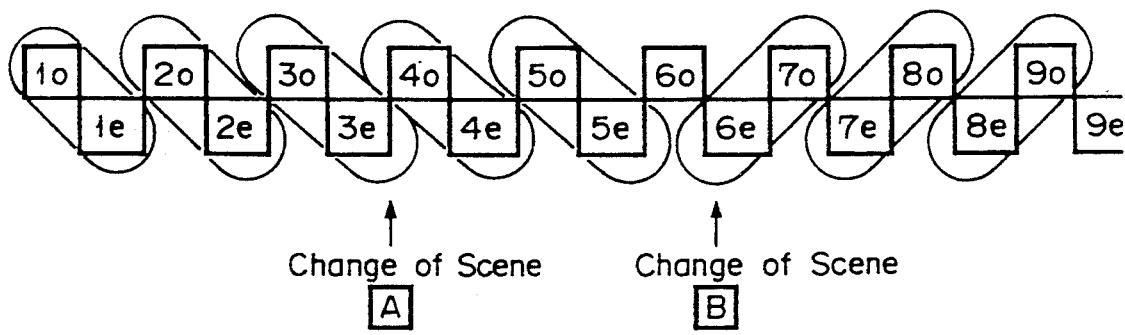
FIG. 7 is a diagram used to explain the change in structure of frames of image data supplied to the switch 1 according to the embodiment shown in FIG. 4.

Let us now assume that a video signal shown in FIG. 7, for example, is input to the encoder (switch 1). In FIG. 7, fields suffixed by o depict odd fields and fields suffixed by e depict even fields. In this embodiment, a scene is changed between the fields 3e and 4o and between fields 6o and 6e as shown by open rectangular blocks A, B in FIG. 7.

As shown in FIG. 7, in each of the first to fifth frames, a frame is composed of an odd field and an even field, and the odd field is the preceding field. In each of the frames succeeding the even field of the sixth frame, the even field is the preceding field, and the even field of the sixth frame and the odd field of the seventh frame constitute one frame. Similarly, the even field of the seventh frame and the odd field of the eighth frame constitute one frame and the even field of the eighth frame and the odd field of the ninth frame constitute one frame.

From the first frame to the third frame, data of preceding odd fields are written in the frame memory 2*f* and data of delay even fields are stored in the frame memory 2*b*. From the fourth to fifth frames, data of the preceding odd fields are written in the frame memory 2*f* and data of delay even fields are stored in the frame memory 2*b*, similarly. Image data of the fourth frame just after the scene was changed is processed as the I picture and other image data are processed as the P picture.

When the image data is processed as the I picture, this moving image data encoder will be operated as follows:

As shown in FIG. 8 of the accompanying drawings, image data of field 4*o* is stored in the frame memory 2*f* and image data of field 4*e* is stored in the frame memory 2*b*. The above data are supplied through the switches 3, 5 to the DCT circuit 6, in which they are processed in a DCT fashion and then quantized by the quantizer circuit 7 as shown in FIG. 4. The data thus quantized by the quantizer circuit 7 is processed in a VLC fashion by the VLC circuit 8 and then recorded on a disc (not shown) or the like. Further, the image data of the odd and even fields 4*o*, 4*e* are supplied from the quantizer circuit 7 to the inverse-quantizer circuit 9, in which it is inversely quantized. The data thus processed by the inverse-quantizer circuit 9 is supplied to the inverse-DCT circuit 10, in which it is processed in an inverse-DCT fashion and then stored in the frame memories 14*af* and 14*ab* through the switches 11 and 13.

Image data of the next fields 5*o* and 5*e* are respectively stored in the frame memories 2*f* and 2*b* and are thereby processed as the P picture. More specifically, data read-out from the frame memories 2*f*, 2*b* are supplied to the adder circuit 4, in which they are added in opposite phase to (i.e., subtracted from) to data of the fields 4*o* and 4*e* supplied thereto from the frame memories 14*af*, 14*ab* through the switch 15. Data subtracted from the data stored in the frame memories 14*af*, 14*ab* as reference data is supplied through the switch 5 to the DCT circuit 6, the quantizer circuit 7 and the VLC circuit 8, in which it is processed in that order and then output. Output data (differential data) of the fields 5*o*, 5*e* from the quantizer circuit 7 are supplied through the inverse-quantizer circuit 9 and the inverse-DCT circuit 10 to the adder circuit 12. The adder circuit 12 is supplied at the other input thereof with data of the fields 4*o*, 4*e* supplied from the frame memories 14*af*, 14*ab* through the delay circuit 16. The adder circuit 12 adds the input data to locally decode the image data. The data thus decoded are supplied through the switches 11, 13 and stored in the frame memories 14*bf*, 14*bb*, respectively.

The above-mentioned processing is what might be called a progressive scan processing, i.e., the data of two fields are encoded as data of one frame.

Then, the odd field 6*o* of the sixth frame is processed as the single field as described in step S5 in FIG. 5. More specifically, data of the odd field 6*o* is written in the frame memory 2*f*. Data read out from the frame memory 2*f* is supplied to the adder circuit 4, in which it is added with data of fields 5*o*, 5*e* read-out from the frame memories 14*bf*, 14*bb* in opposite polarity. Then, data output from the adder circuit 4 is processed by the DCT circuit 6, the quantizer circuit 7 and the VLC circuit 8 in that order and then output. The differential data of the odd field 6*o* from the quantizer circuit 7 is sequentially processed by the inverse-quantizer circuit 9 and the inverse-DCT circuit 10 and then fed to the adder circuit 12, in which it is added with data of the fields 5*o*, 5*e* supplied thereto through the delay circuit 16, thereby being decoded. The data thus decoded is written in the frame memory 14*af*.

Then, the data of the odd field 6*o* stored in the frame memory 2*f* is updated by the data of the preceding even field 6*e* of the next frame and the data of odd field 7*o*, which constitutes the frame together with the even field 6*e*, is written in the other frame memory 2*b*. Since this image data is the image data provided immediately after the scene is changed, this image data is processed as the I picture. That is, data read-out from the frame memories 2*f*, 2*b* are processed by the DCT circuit 6, the quantizer circuit 7 and the VLC circuit 8 in that order and then output as they are. The data from the quantizer circuit 7 are processed by the inverse-quantizer circuit 9 and the inverse-DCT circuit 10 and then written in the frame memories 14*bf*, 14*bb*, respectively. Image data of the frame composed of the next fields 7*e* and 8*o* are written in the frame memories 2*f*, 2*b*, respectively and are thereby processed as the P picture.

Figure 9:
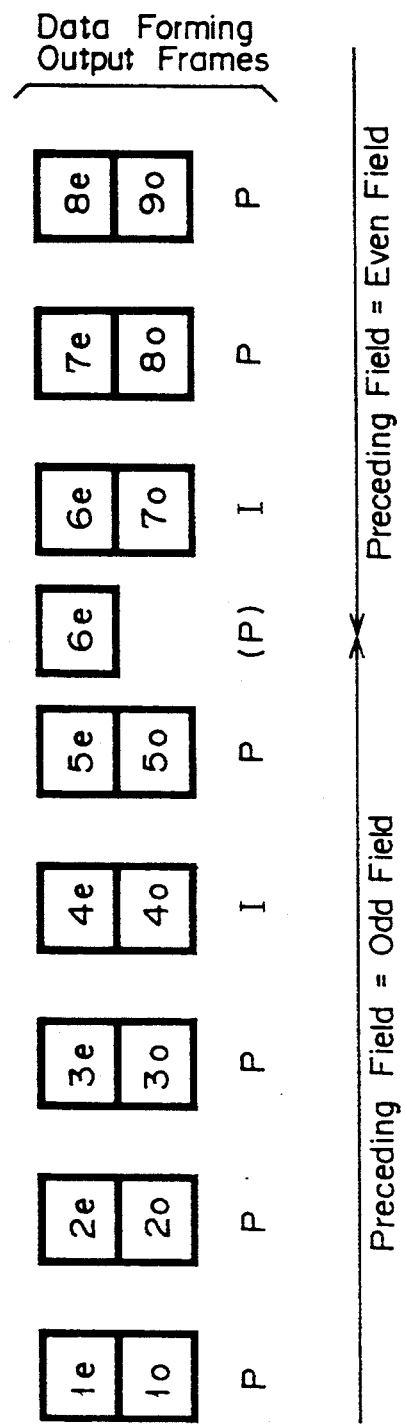
FIG. 9 is a diagram used to explain data output according to the embodiment of FIG. 4.

Image data output from the encoder as described above are presented as shown in FIG. 9. Image data of each of the frames are output as a bit stream having a format shown in FIG. 10, for example.

Figure 10:
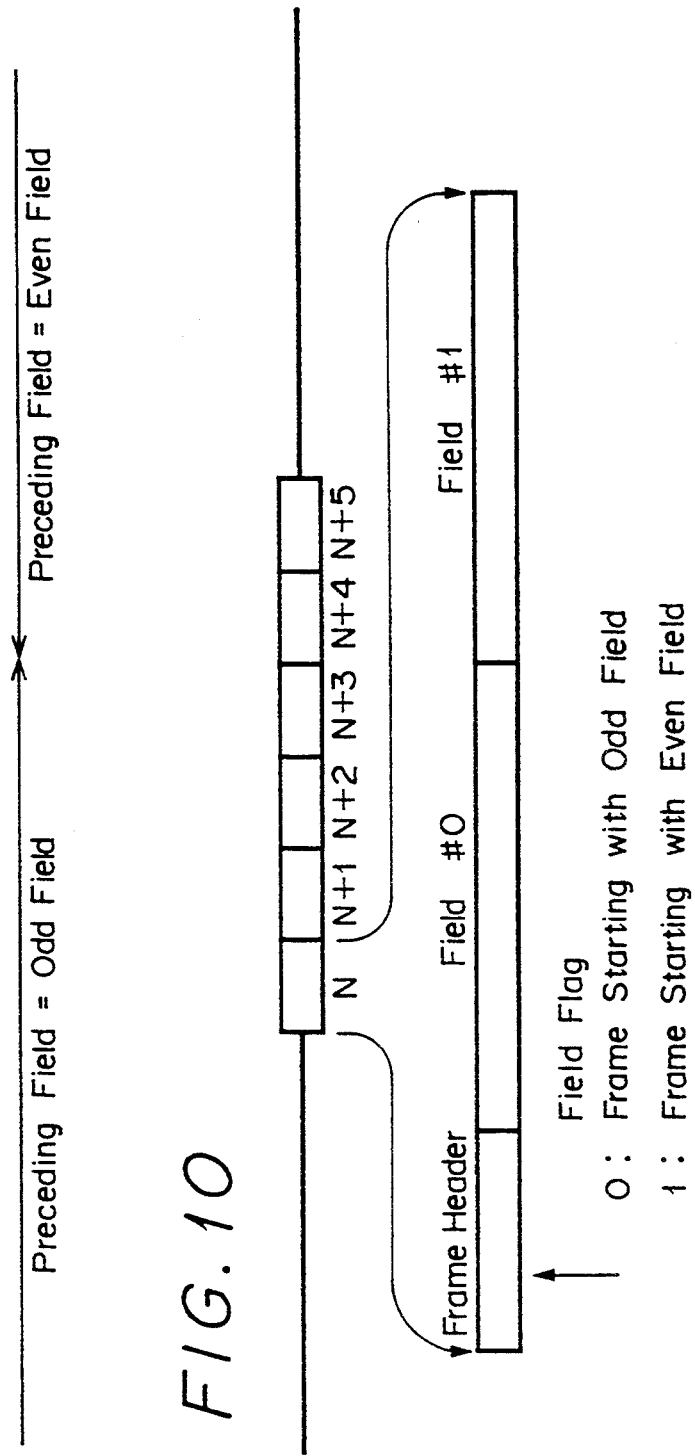
FIG. 10 is a diagram used to explain a recording format in a moving picture compressing and recording medium according to the present invention.

As shown in FIG. 10, each frame is composed of two corresponding fields and a frame header is disposed at the top of each frame. The field flag (see step S6 of FIG. 5) is recorded in the frame header. That is, this field flag is set to "0" when the frame begins with the odd-field and set to "1" when the frame begins with the even-field.

Figure 11:
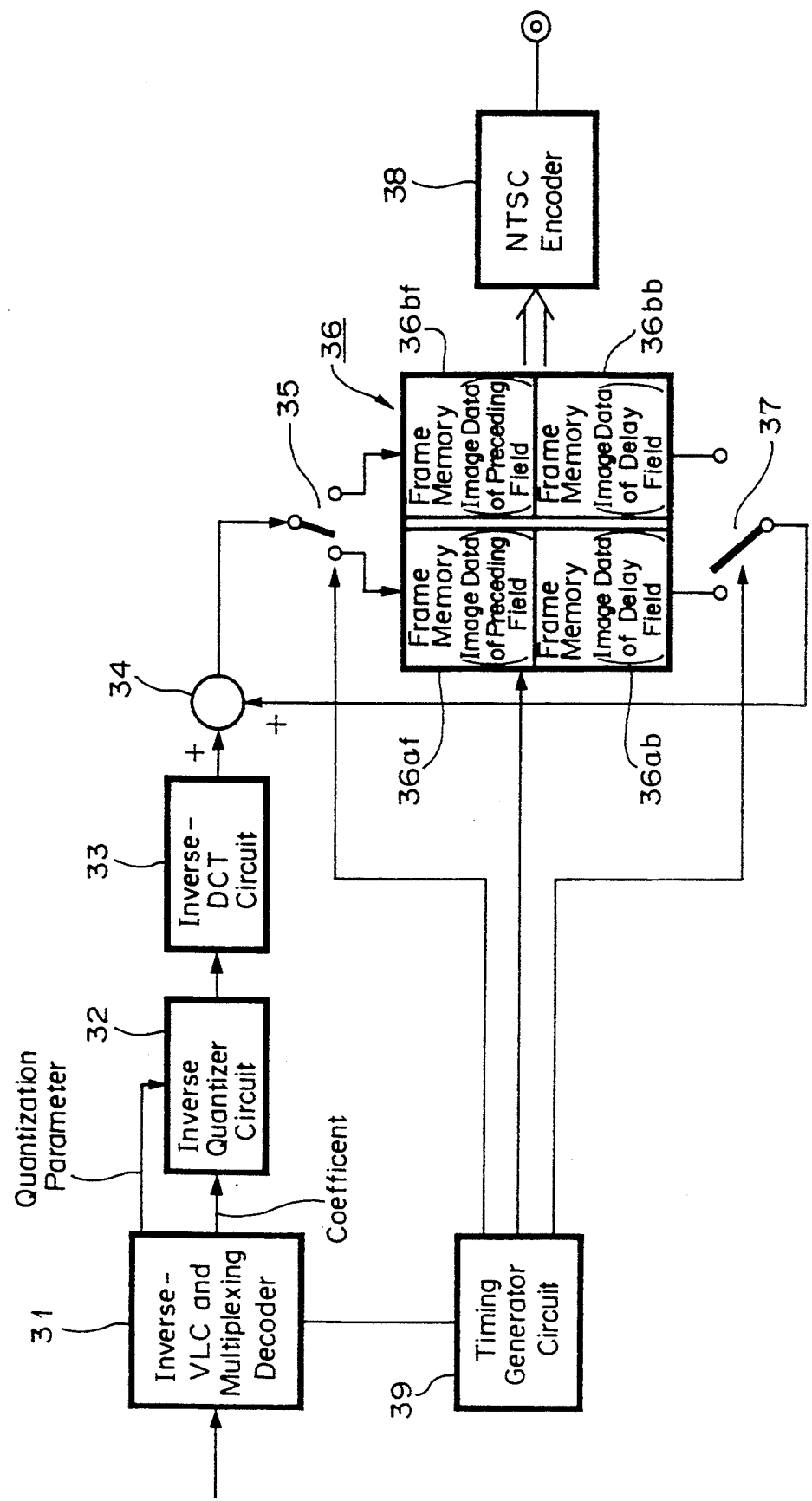
FIG. 11 is a block diagram showing a moving image data decoder according to an embodiment of the present invention.

FIG. 11 of the accompanying drawings shows in block form an arrangement of a moving image data decoder according to an embodiment of the present invention. Moving image compressed data, which is recorded, for example, in a disc in accordance with the recording format shown in FIG. 10, is reproduced from the disc and then supplied to this moving image data decoder. In this case, a transmission medium is not limited to the disc and other media than the disc may be used.

Referring to FIG. 11, an inverse-VLC and multiplexing decoder 31 decodes input data to provide a quantization parameter, a coefficient and a field flag. Then, the quantization parameter and the coefficient are supplied to an inverse-quantization circuit 32 and the field flag is supplied to a timing generator circuit 39. An output of the inverse-quantizer circuit 32 is supplied to an inverse-DCT circuit 33 and an output of the inverse-DCT circuit 33 is supplied through an adder circuit 34 and a switch 35 and stored in frame memories 36*af*, 36*ab*, 36*bf*, 36*bb*.

Data read-out from the frame memories 36*af* through 36*bb* are supplied through a switch 37 to the adder circuit 34, in which they are added with the output data from the inverse-DCT circuit 33. An NTSC encoder 38 operates to convert data, output from the frame memories 36*af* through 36*bb*, to data of the NTSC format and output the same. The timing generator circuit 39 is adapted to generate switching signals for the switches 35, 37 and address signals for the frame memories 36*af* through 36*bb*.

Operation of the above moving image data decoder showing in FIG. 11 will be described below.

Figure 12:
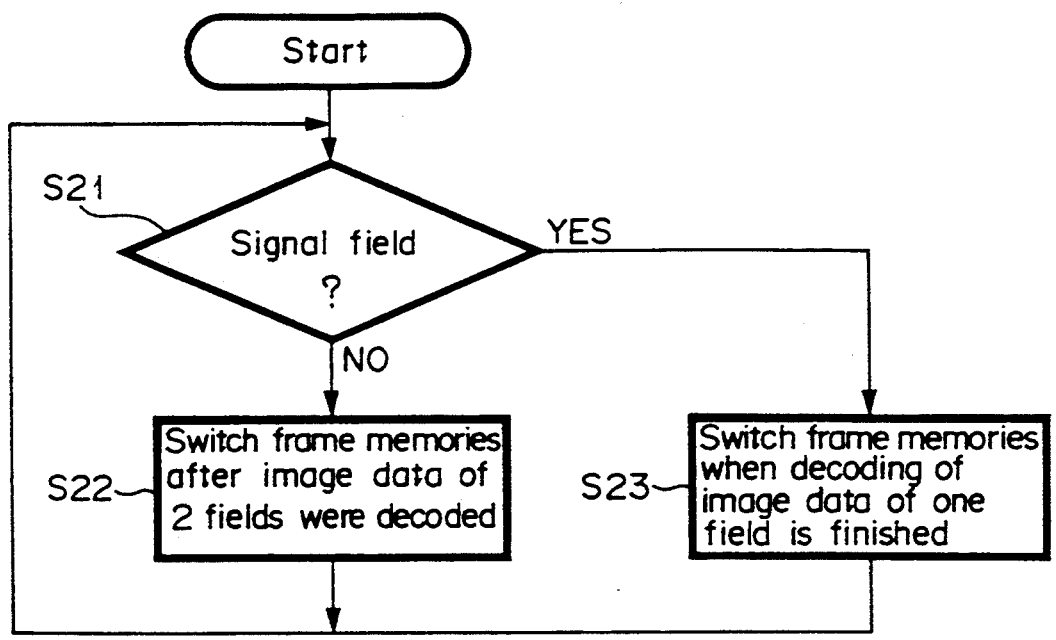
FIG. 12 is a flowchart to which references will be made in explaining an algorithm with which the frame memories in the embodiment shown in FIG. 11 are switched.

FIG. 12 of the accompanying drawings is a flowchart used to explain an algorithm with which the frame memories 36*af* through 36*bb* shown in FIG. 11 are switched.

Referring to FIG. 12, following the Start of operation, it is determined in decision step S21 whether or not the field is a single field. If the field is not a single field as represented by a NO at decision step S21, then the processing proceeds to the next step S22, whereat the frame memories 36*af* through 36*bb* (switches 35 and 37) are switched after image data of 2 fields were decoded. If on the other hand the field is determined to be a single field as represented by a YES at decision step S 21, then the processing proceeds to step S23, whereat the frame memories 36*af* through 36*bb* (switches 35 and 37) are switched when the decoding of image data of one field is finished.

Figure 13:
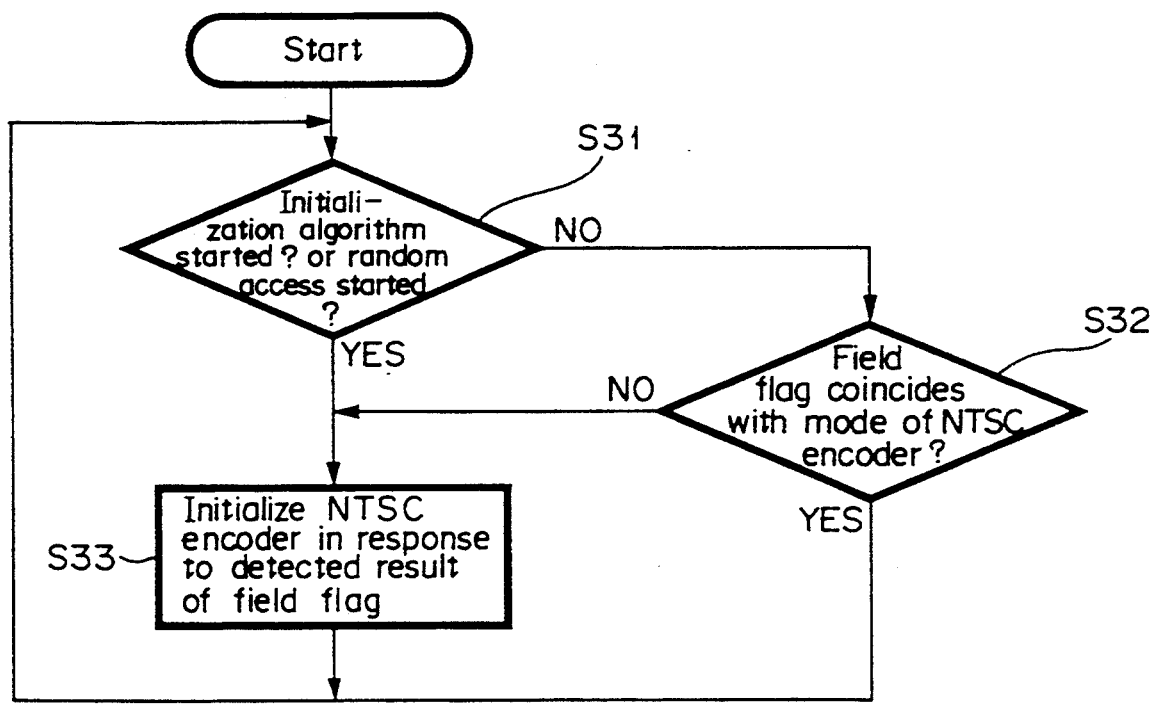
FIG. 13 is a flowchart to which references will be made in explaining an initialization algorithm of the NTSC encoder 38 in the embodiment shown in FIG. 11.

FIG. 13 of the accompanying drawings shows a flowchart to which references will be made in explaining an initialization algorithm of the NTSC encoder 38.

As shown in FIG. 13, following the Start of operations, it is determined in decision step S31 whether the initialization of the NTSC encoder 38 is just started or random access is just made. If the initialization algorithm is just started or the random access is just made as represented by a YES at decision step S31, then the processing proceeds to the next step S33, whereat the field flag is detected and the NTSC encoder 38 is initialized in response to the detected result of the field flag. For example, if the field flag is "0", then the NTSC encoder 38 encodes data on the assumption that the data for the input frame is composed of a preceding odd field and a delay even field. If the field flag is "1", then the NTSC encoder 38 encodes data on the assumption that the frame is composed of data for a preceding even field and a delay odd field.

If on the other hand the initialization algorithm is not yet started or the random access is not yet made as represented by a NO at decision step S31, then the processing proceeds to the next decision step S32. It is determined in decision step S32 whether or not the field flag coincides with the mode of the NTSC encoder 38. If they are coincident with each other as represented by a YES at decision step S32, then the processing returns to step S31. If on the other hand the field flag is not coincident with the mode of the NTSC encoder 38 as represented by a NO at decision step S32, then the processing proceeds to step S33, and the initialization operation corresponding to the field flag is executed.

Figure 14:
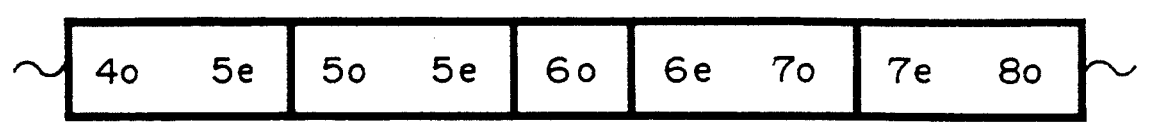

Assuming now that image data shown in FIG. 14 is input to the inverse-VLC and multiplexing decoder 31, then the decoder executes the processing shown in FIG. 15. More specifically, when the data for the I picture formed of field 4*o* and field 4*e* are input to the inverse-VLC and multiplexing decoder 31, these data are decoded in a multiplexing fashion by the decoder 31. Then, the quantizing parameter and coefficient thereof are supplied to the inverse-quantizer circuit 32, in which they are quantized in an inverse-quantizing fashion. An output of the inverse-quantizer circuit 32 is supplied to the inverse-DCT circuit 33, in which it is processed in an inverse-DCT fashion. Data of fields 4*o* and 4*e* output from the inverse-DCT circuit 33 are supplied through the adder circuit 34 and the switch 35 and then respectively stored in the frame memories 36*af*, 36*ab*. Since the picture formed of data of fields 4*o* and 4*e* is the I picture, these data are read out from the frame memories 36*af*, 36*ab* and then fed to the NTSC encoder 38, in which they are converted into data of the NTSC format and then output.

Data for the P picture formed of fields 5*o*, 5*e* are processed by the inverse-quantizer circuit 32 and the inverse-DCT circuit 33 and then fed to the adder circuit 34. The adder circuit 34 is supplied at the other input thereof with data of fields 4*o*, 4*e* read-out from the frame memories 36*af*, 36*ab* through the switch 37. Then, the adder circuit 34 adds and decodes both input data. The decoded data of the fields 5*o*, 5*e* are supplied through the switch 35 and then respectively written in the frame memories 36*bf*, 36*bb*. When data of field 6*o* is input to one input of the adder circuit 34 from the inverse-DCT circuit 33, data of the fields 5*o*, 5*e* read-out from the frame memories 36*bf*, 36*bb* are supplied through the switch 37 to the other input terminal of the adder circuit 34. Then, the adder circuit 34 adds both input data to decode data of the field 6*o*. This data of the field 6*o* is supplied through the switch 35 and stored in the frame memory 36*af*.

Since the data for the frame composed of fields 6*e*, 7*o* represents an I picture, the data is processed by the inverse-quantizer circuit 32 and the inverse-DCT circuit 33 and then stored in the frame memories 36*bf*, 36*bb*. Then, since data for the frame composed of fields 7*e*, 8*o* represents a P picture, the data is added to reference data of fields 6*e*, 7*o* read-out from the frame memories 36*bf*, 36*bb* and then decoded by the adder circuit 34.

The NTSC encoder 38 processes the fields 4*o*, 4*e* as one frame and also processes data formed of fields 5*o*, 5*e* as one frame. Further, the NTSC encoder 38 processes data formed of field 6*o* as the single field and processes data formed of fields 6*e*, 7*o* as the frame having the preceding even field. This is also true for the frame formed of fields 7*e*, 8*o*.

As described above, according to the moving image compressing and recording medium of the present invention, since the flags for identifying the frame starting with the odd field and the frame starting with the even field are recorded thereon, the moving image according to the interlace scanning system can constantly be processed at correct timing by detecting the above field flags.

According to the moving image data encoder of the present invention, since the image of one field is encoded independently when the scene is changed, efficiency with which the moving image is compressed can be prevented from being lowered. Hence, the image can be prevented from being blurred.

Furthermore, according to the moving image data decoder of the present invention, since the operation mode is changed in response to the detected result of the flag, the image according to the interlace scanning system can constantly be processed properly.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A moving image data decoder for receiving and decoding a data stream including frames of compressed moving image video data, said compressed moving image video data representing an interlace-scanned moving image video signal, each said frame having odd-numbered lines and even-numbered lines said frames including frames of a first type and frames of a second type, each said frame of the first type having odd-numbered lines that represent a field of said interlace-scanned video signal that is earlier in time than a field of said interlace-scanned video signal represented by the even-numbered lines of said frame of the first type, each said frame of the second type having even-numbered lines that represent a field of said interlace-scanned video signal that is earlier in time than a field of said interlace-scanned video signal represented by the odd-numbered lines of said frame of the second type, said data stream including a respective flag associated with each of said frames for indicating whether the frame with which said flag is associated is of the first type or of the second type, said decoder comprising:

means for detecting said flag associated with each of said frames included in said video data stream; and means responsive to said means for detecting for processing the frame with which said detected flag is associated in a first operation mode if said detected flag is indicative of a frame of the first type and for processing the frame with which said detected flag is associated in a second operation mode if said detected flag is indicative of a frame of the second type.

2. Apparatus for encoding an interlace-scanned moving image video signal to form a video data stream, comprising:

frame means for forming frames from adjacent fields of said interlaced-scanned moving image video signal, each of said fields being either an odd field which represents odd-numbered lines of said moving image signal or an even field which represents even-numbered lines of said moving image signal, each of said frames being composed of an odd field and an even field, said frame means operating to selectively form frames of a first type and frames of a second type, wherein each frame of the first type has a respective odd field that is earlier in time than a respective even field of said frame of the first type, and each frame of the second type has a respective even field that is earlier in time than a respective odd field of said frame of the second type;

means for encoding said frames formed by said frame means in a progressive-scan fashion to produce corresponding frames of digital video data; and means for outputting said frames of digital video data as said video data stream.

3. Apparatus for encoding according to claim 2; further comprising means for generating frame header data; and wherein respective frame header data is included in said video data stream with each of said frames of digital video data, said respective frame header data including a field flag for indicating whether the respective frame is of the first type or the second type.

4. Apparatus for encoding according to claim 3; wherein said means for encoding includes means for selectively encoding a single field of said moving image video signal to produce digital video data corresponding to said single field; and said digital video data corresponding to said single field is included in said video data stream.

5. Apparatus for encoding according to claim 3; further comprising means for recording said video data stream on a recording medium.

6. Apparatus for encoding according to claim 5; wherein said recording medium is a compact disc.

7. A method of encoding an interlace-scanned moving image video signal to form a video data stream, comprising the steps of:

forming frames from adjacent fields of said interlace-scanned moving image video signal, each of said fields being either an odd field which represents odd-numbered lines of said moving image signal or an even field which represents even-numbered lines of said moving image signal, each of said frames being composed of an odd field an even field, said forming step including selectively forming each frame as a frame of a first type or a frame of a second type, wherein each frame of the first type has a respective odd field that is earlier in time than a respective even field of said frame of the first type, and each frame of the second type has a respective even field that is earlier in time than a respective odd field of said frame of the second type;

encoding the frames of the first and second types in a progressive-scan fashion to produce corresponding frames of digital video data; and outputting said frames of digital video data as said video data stream.

8. A method according to claim 7; further comprising the step of generating a field flag for each of said frames of digital video data, said field flag indicating whether the respective frame of digital video data corresponds to a frame of the first type or to a frame of the second type.

9. A method according to claim 8; further comprising the steps of:

encoding a single field of said moving image video signal to produce digital video data corresponding to said single field; and including in said video data stream said digital video data corresponding to said single field.

10. A method according to claim 8; further comprising the step of recording said video data stream on a recording medium.

11. A method according to claim 10; wherein said recording step includes recording said video data stream on a compact disc.

* * * * *